UNITED STATES PATENT OFFICE.

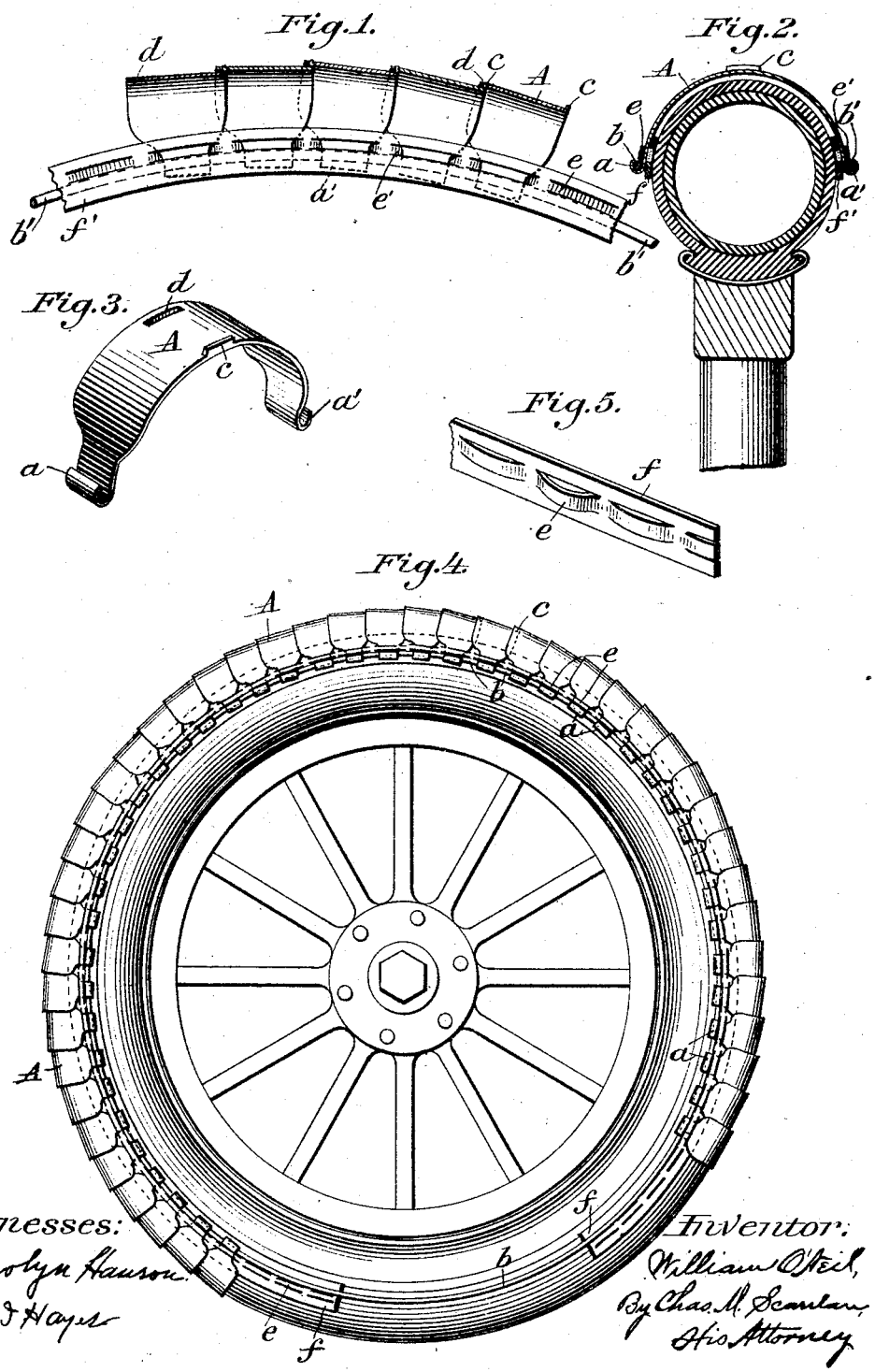

WILLIAM O'NEIL, OF MILWAUKEE, WISCONSIN.

TIRE-ARMOR.

No. 924,924.　　　　Specification of Letters Patent.　　Patented June 15, 1909.

Application filed August 14, 1908. Serial No. 448,621.

*To all whom it may concern:*

Be it known that I, WILLIAM O'NEIL, a citizen of the United States, residing at Milwaukee, in the county of Milwaukee and State of Wisconsin, have invented certain new and useful Improvements in Tire-Armors, of which the following is a specification.

My invention relates to certain new and useful improvements in tire armors especially adapted to be used in connection with pneumatic tires, the object being to provide an annular shield or armor consisting of a plurality of metallic sections, each section articulating with the next two sections, and held in place by a metallic ring on each side, and a leather or pliable belt on each inner side to protect the rubber tire, so as to make a complete circumferential shield or armor for the periphery and adjoining portion of the tire exposed.

A still further object of my invention is to provide a tire armor which is exceedingly simple and cheap in construction, and one in which the sections are so connected together and held in position upon the tire that all danger of the sections becoming accidentally detached, is prevented.

With these objects in view, my invention consists in the novel features of combination, and arrangement of parts, hereinafter fully described and pointed out in the claims.

In the drawing forming a part of this specification: Figure 1 is a vertical section through a portion of my improved tire armor. Fig. 2 is a transverse section through a wheel showing my improved armor in position thereon. Fig. 3 is a perspective view of one of the armor sections. Fig. 4 is a side elevation of a wheel showing my improved armor in position thereon, and Fig. 5 is a perspective view of a portion of the leather belt.

In carrying out my invention I employ a plurality of sections to form my armor, each section consisting of a metallic saddle or clip A, curved to fit the periphery of the tire transversely, and reduced at its ends, which are bent upwardly to form hooks or bearings $a$, $a'$, adapted to receive metallic rings $b$, $b'$, as will be hereinafter described. A lug or spur $c$, is formed at one end of each of the sections, about midway between the hooks, and adjacent the other edge of the section in transverse alinement with the lug, a slot $d$ is formed which is adapted to receive the lug of the adjacent section, when the sections are placed together, over a tire to form the armor.

In connection with the armor sections, I use a pair of leather belts $f$, $f'$, which are provided with parallel slits forming loops $e$, $e'$, through which the ends of the armor sections are adapted to be inserted before the metallic rings $b$, $b'$, are placed in position in the hooks of the sections, and it will be seen that by this arrangement the armor sections are held away from the tire a slight distance by the belts, which form protectors for the sections, so as to prevent the tire from becoming injured, and it will also be seen that the loops of the belt prevent the rings from moving upwardly out of the hooks of the sections, so that all danger of the rings becoming accidentally detached, by the sudden exertion, is prevented.

It is of course understood that the metallic rings are formed of such size that they will fit snugly within the hooks of all of the sections of the armor, so as to securely hold the sections in their proper positions.

In placing my improved armor on a tire, the hooked ends of the sections are forced under the loops of the belt, on each side, and the spurs of the sections are forced into the slots of the sections, so as to lock the sections in their proper position in respect to each other, and the metallic rings are then placed in position in the hooks of the sections which securely hold the sections, so that it is impossible for one of the same to become accidentally detached.

The armor is fitted to the tire, sufficiently loose to allow a very slow retrogressive movement of the armor circumferentially around the tire, so as to prevent the tire from wearing unevenly, this movement being produced by the form and manner of adjusting the sections, and narrowing their ends.

What I claim as my invention, and desire to secure by Letters Patent is:

1. An armor for pneumatic tires comprising a plurality of overlapping and interlocking sections, curved to fit over a tire, and having hooks at their ends, belts of pliable material adapted to fit on the opposite sides of the tire, and provided with a plurality of loops through which the ends of the sections project, and metallic rings engaging the hooks of the section.

2. An armor for pneumatic tires comprising a plurality of overlapping and interlocking sections, curved to fit over a tire, said sections having reduced ends and hooks on said ends, leather belts adapted to fit on opposite sides of the tire and each being provided with a plurality of pairs of parallel slits forming loops through which the reduced ends of the sections project, and metallic rings engaging the hooks of the sections.

In testimony whereof I affix my signature in presence of two witnesses.

WILLIAM O'NEIL.

Witnesses:
MARGARET FENTON,
ELSIE M. HOTZ.